Figure 3:
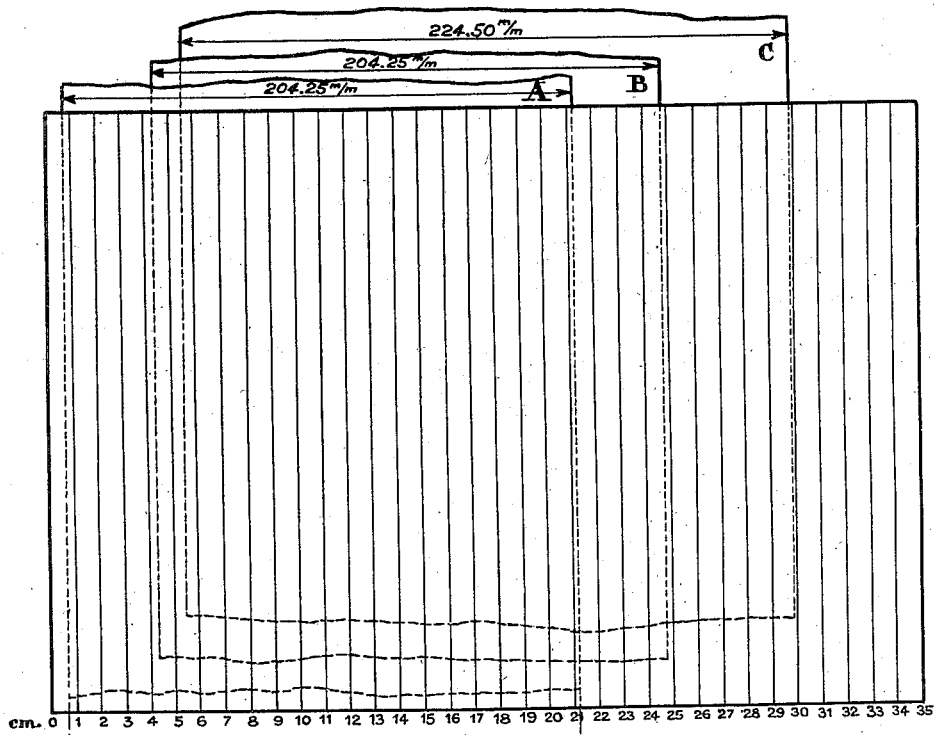

April 30, 1935.  J. F. MÉRIGUET  1,999,338
MANUFACTURE OF GLOVES
Filed Jan. 23, 1932  2 Sheets-Sheet 1
Fig.1
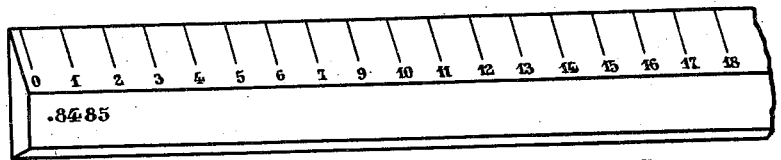
Fig.2ª  Fig.2ᵇ
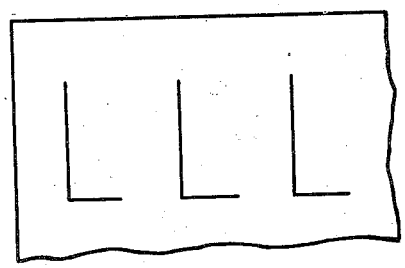 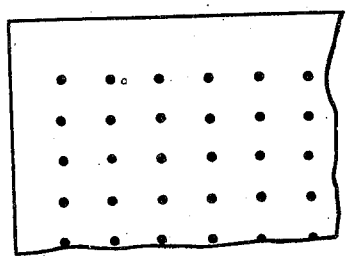
Fig.2ᶜ  Fig.2ᵈ
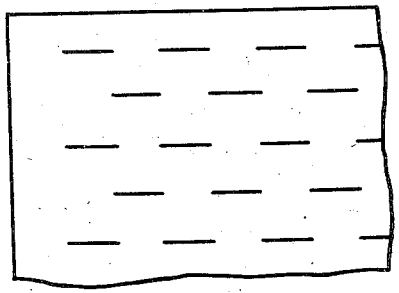 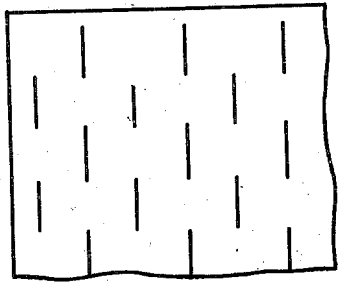
Fig.2ᵉ  Fig.2ᶠ
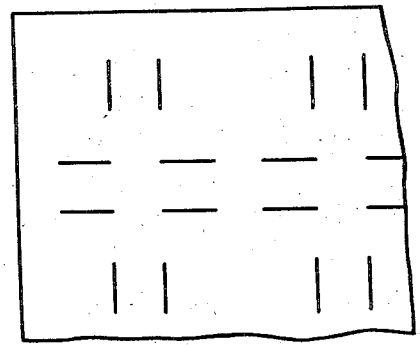 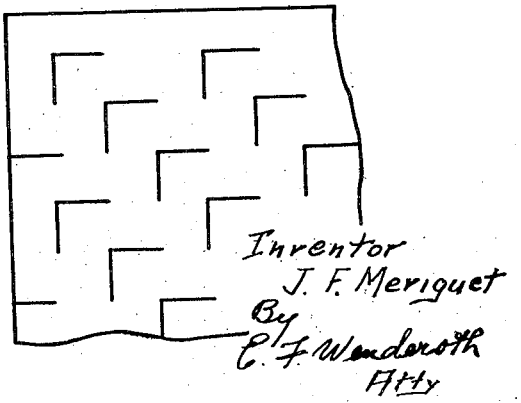
Inventor
J. F. Meriguet
By
C. F. Wenderoth
Atty April 30, 1935.  J. F. MÉRIGUET  1,999,338
MANUFACTURE OF GLOVES
Filed Jan. 23, 1932  2 Sheets-Sheet 2

Inventor
J. F. Meriguet
By C. F. Wenderoth
Atty

Patented Apr. 30, 1935

1,999,338

UNITED STATES PATENT OFFICE 1,999,338

MANUFACTURE OF GLOVES

Julien François Mériguet, St. Junien, France

Application January 23, 1932, Serial No. 588,474
In France January 28, 1931

3 Claims. (Cl. 2—169)

The present invention relates to a process for the manufacture of gloves.

The manufacture of gloves has so far been entirely empirical; in other words no fast rules adaptable to various working conditions are used in connection with this manufacture. The methods used heretofore have as a result a substantial waste of labor and material.

According to said methods the leather is stretched after having been laid in the direction of the length of the glove. The leather is then cut in strips according to the length of the gloves whereupon it is stretched in the direction of the width of the glove, the various parts which are to provide the gloves, the thumbs, and the forks being then cut out. After this operation, the gloves, the thumbs and the forks are stretched in the direction of the width and the excess is trimmed off with scissors. Subsequently a contour is marked in the direction of the length and (or) of the width so that the operator may ascertain whether the size has been preserved in the previous cutting operations and whether the parts should be trimmed again or not during the following operations or used for another glove size. This marking of the contour allows also of finding out later whether the parts have been stretched evenly when laid in the direction of the length and whether the cutting in lengths has remained within the desired limits. The parts of the gloves, the thumbs and the forks are then stretched lengthwise to make their width correspond with the apparent width of the stencils, corresponding to the stamp of the chosen size. By means of scissors the parts are then given their length, which parts are then piled one above another and the operator sticks them together with his tongue so that for example 3, 4, 5 or 6 pairs are prevented from sliding one on top of another during the stamping which takes place by laying the piles of gloves, thumbs and forks over or under a stamping punch, under the head of a stamping press. Finally the burr left by the stamp on either side of the glove is removed by means of scissors.

This method involves complicated operations which must be carried out most carefully to secure a great regularity of sizes and which can be performed only by skilled workmen having had a long apprenticeship. Said method has furthermore a great number of drawbacks:

In the same size, great differences are found in the easiness of the fit of the gloves which is the result of a difference in the stretching and therefore of a difference in the ratio of reduction of the various parts stamped out with the same stamping punch. Furthermore the scale of apparent widths of the different stamping punches does not correspond to a regular ratio of reduction. Said ratio is obtained by dividing the apparent width of the stamping punch into the actual width of the gloves or thumbs.

Said method results furthermore in a great waste of material on account of the great number of cuttings and trimmings and on account of the lack of correspondence between the grading of apparent width and the ratio of reduction, the operator being obliged to favor the length when cutting the leather, specially in the case of the smaller sizes, so as to make sure that the pieces have the length needed for the stretching following the marking.

The result of this method is an irregular fit of the gloves because each worker gives, when cutting the leather to length, an irregular stress to the material, the worker having as a guide only his personal appreciation resulting of his experience.

By this method a large production is not possible because the shaping involves too great a number of tedious operations. A worker cannot make more than about thirty pairs of gloves daily and the result is a high manufacturing cost.

The particular method of sticking together the pieces for which method a substitute has not yet been found, helps to the propagation of tuberculosis.

Finally, it is to be noted that skilled labor is becoming scarce in this trade on account of the long apprenticeship required.

The following table shows the variations which may be found in the ratio of reduction for the gloves and the thumbs of different sizes cut out of the same piece of leather according to the old known method.

| Gloves | | | | Thumbs | | | |
|---|---|---|---|---|---|---|---|
| Size | Length in millimeters | Apparent length | Ratio of reduction | Size | Length in millimeters | Apparent length | Ratio of reduction |
| 7 | 204.25 | 178 | .8714 | 7 | 95.1 | 81 | .8517 |
| 7¼ | 210.7 | 178 | .8448 | 7¼ | 98.6 | 81 | .8215 |
| 7½ | 218.0 | 188 | .8622 | 7½ | 102.0 | 86 | .8431 |
| 7¾ | 224.5 | 188 | .8374 | 7¾ | 105.5 | 86 | .8151 |
| 8 | 231.5 | 200 | .8639 | 8 | 108.5 | 90 | .8276 |
| 8¼ | 238.0 | 200 | .8403 | 8¼ | 112.2 | 90 | .8021 |
| 8½ | 245.0 | 211 | .8612 | 8½ | 115.5 | 93 | .8051 |
| 8¾ | 251.5 | 211 | .8389 | 8¾ | 119.0 | 93 | .7815 |
| 9 | 258.2 | 219 | .8481 | 9 | 122.2 | 95 | .7774 |
| 9¼ | 265.0 | 219 | .8364 | 9¼ | 125.7 | 95 | .7557 |
| 9½ | 271.5 | 226 | .8321 | 9½ | 129.0 | 97 | .7519 |
| 9¾ | 278.5 | 226 | .8114 | 9¾ | 132.5 | 97 | .7320 |

As can be seen the ratio varies within a wide range from .7320 to .8714, and it is obvious that these variations make is impossible to cut the leather without previous stretching and marking of each piece separately.

The present invention removes to a great extent above-mentioned drawbacks. In accordance with the invention a same ratio of reduction is applied to the whole piece of leather which makes it possible to cut out of said piece of leather parts which will all behave the same way when stretched in the other direction in other words in a direction perpendicular to the direction of the previous stretching.

The following table shows by way of example the measurements of the gloves and thumbs cut out of a piece of leather according to the invention:

| Gloves | | | | Thumbs | | | |
|---|---|---|---|---|---|---|---|
| Size | Length in millimeters | Apparent length | Ratio of reduction | Size | Length in millimeters | Apparent length | Ratio of reduction |
| 7 | 204.25 | 173.31 | .8485 | 7 | 95.1 | 80.70 | .8485 |
| 7¼ | 210.7 | 178.77 | .8485 | 7¼ | 98.6 | 83.67 | .8485 |
| 7½ | 218.0 | 184.98 | .8485 | 7½ | 102.0 | 86.55 | .8485 |
| 7¾ | 224.5 | 190.49 | .8485 | 7¾ | 105.5 | 89.52 | .8485 |
| 8 | 231.5 | 196.43 | .8485 | 8 | 108.5 | 93.07 | .8485 |
| 8¼ | 238.0 | 201.95 | .8485 | 8¼ | 112.2 | 95.21 | .8485 |
| 8½ | 245.0 | 207.89 | .8485 | 8½ | 115.5 | 98.01 | .8485 |
| 8¾ | 251.5 | 213.40 | .8485 | 8¾ | 119.0 | 100.98 | .8485 |
| 9 | 258.2 | 219.09 | .8485 | 9 | 122.2 | 103.69 | .8485 |
| 9¼ | 265.0 | 224.86 | .8485 | 9¼ | 125.7 | 106.66 | .8485 |
| 9½ | 271.5 | 230.37 | .8485 | 9½ | 129.0 | 109.46 | .8485 |
| 9¾ | 278.5 | 236.31 | .8485 | 9¾ | 132.5 | 112.43 | .8485 |

When working in accordance with my new method, the operations involved are reduced to:

1. A thorough stretching of the moistened leather in one direction;
2. The impression of marks in equally spaced relation in both parallel and perpendicular directions to the direction of said thorough stretching;
3. A second and final stretching in a direction perpendicular to the first stretching until the space between each of the marks registers with a scale bearing a predetermined ratio to the spacing of the original marks;
4. The stamping by means of dies or punches of all pieces, thumbs and forks inclusive, out of the leather after a selection of the location of the stamping punches by means of stencils.

In order to make clearer the present invention it will be explained hereinafter with reference to accompanying drawings.

Figure 1 shows a rule used to control the ratio of reduction of the leather.

Figures 2ª, 2ᵇ, 2ᶜ, 2ᵈ, 2ᵉ and 2ᶠ show by the way of examples some different kind of marks which may be applied to the flesh side of the leather.

Figure 4:
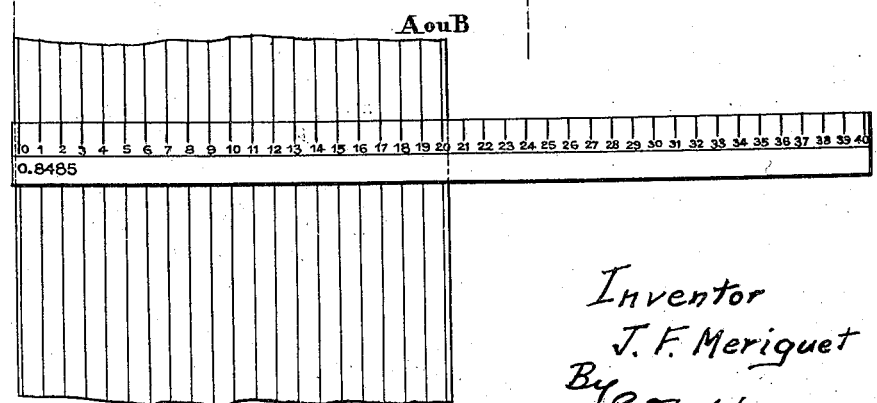

Figures 3 and 4 show in which way the relative lengths of the pieces may be controlled before and after the leather is laid in the direction of the length.

In accordance with this invention, the previously moistened leather is first stretched thoroughly in the direction of the width of the pieces to be cut out. The edges are flattened with a blunt knife and on the flesh side of the leather marks are impressed at predetermined equal distances, the marks being allowed to dry during a few minutes if necessary.

By a second stretching in a direction perpendicular to the first one the leather is brought to the desired ratio of reduction of say .8485. To control the regularity of the extension of the material during the second stretching, a rule such as shown on Figure 1 is preferably used, said rule having a suitable length for the surface to be cut and being provided with a graduation based on the desired ratio of reduction which in the present case is .8485. The marks left on the flesh side of the leather after the first stretching being placed for example at distances 1 centimeter from one another, the strokes of the rule should be at a distance of 8.485 millimeters from each other in the case considered. By this second stretching, if the first one has been carried out thoroughly on the whole leather piece, the marks marked on said leather come closer together and they may be made to correspond to the strokes of the rule, which shows that every part of the leather is expanded to correspond to a ratio of reduction of .8485.

The marks on the leather should not necessarily be printed with ink. They may be hollow or embossed marks on fugaceous marks. They may extend over the whole leather piece or over part of it and may take the form of lines or such forms as shown on Figures 2ª to 2ᶠ.

Figure 3 shows part of a marking stamp divided in centimeters and facing a piece of leather previously stretched in the direction of the width of the pieces. Supposing pieces of 204.25 millimeters (size 7) or pieces of 224.5 millimeters (size 7¾) should be cut; the figure shows that the relative position of the leather and printing stamp may be varied. In other words the location of the different pieces on the leather may be chosen.

Figure 4 shows the same pieces stretched in the direction of the width according to the ratio of reduction .8485 and placed in front of the corresponding points of a rule the divisions of which are reduced in the same ratio. The drawings show that each of the marks of the leather piece corresponds exactly to a stroke of the scale marked according to said ratio. The leather pieces for the size 7 have then an apparent length of about 173.03 millimeters and those for the size 7¾ have an apparent length of about 190.5 millimeters.

If the marks do not match exactly after the stretching in the direction of the width, said stretching should be continued until they actually match.

It is obvious that the pieces of leather may also be marked in the direction perpendicular to the direction of stretching but in such case the divisions of the rule should correspond to the ratio $$\frac{1}{.8485} = 1.179.$$

The edges are flattened again if necessary and the leather pieces are then placed on the gutta lined table of a punching press. Stencils corresponding to the ratio .8485 in the width and 1.179 in the length, preferably of transparent material, are then placed upon the leather to select the location of the gloves, thumbs and forks so as to avoid the inclusion of defective spots of the leather in the glove, each piece (gloves, thumbs, forks) being of course turned with its length in the direction of stretching. It is only necessary then to place the stamping punch corresponding to the size upon the leather and to punch the latter. There is no need of care about the lengths and proportions of the punched pieces as the required size will always be contained therein.

It is possible to work with different reduction ratios for a given quality of leather and to obtain with one stamping punch gloves of different sizes. In case the waste after the punching of the gloves does not allow the punching of thumbs and forks, the waste pieces suitably marked are stretched in the other direction to the same reduction ratio and said glove parts are punched out in the new direction whereby a much better utilization of the leather is brought about.

The process just described can be applied to any style of gloves of whatever length or shape, straight, turned over or flaring and to any kind of hides provided they can be stretched to some extent. The reduction ratio varies of course with the kind of hide which may vary more or less in extensibility. Finally this method can be applied to any fabric, and to any vegetable or animal woven, cast or rolled, more or less flat material, provided said fabrics or materials can be stretched in one direction or in either direction.

The ratio of reduction depends of course on the kind of material used and is always taken smaller than that corresponding to the stretching limit of any part of said material.

What I claim is:

1. A method for cutting the different parts of the gloves comprising a thorough stretching of the moist leather in one direction, the impression of a plurality of marks placed in equally spaced relation, on the leather, the stretching of the leather in a perpendicular direction to the first named direction until each of said marks matches with a scale the marks of which are spaced according to a predetermined ratio to the spaced relation referred to above, and the punching of said different parts.

2. A method for cutting the different parts of the gloves comprising a stretching of the moist leather in one direction, the impression of a plurality of marks on the leather in equally spaced relation in both parallel and perpendicular directions to the direction of said stretching, a second and final stretching in a direction perpendicular to that of the first stretching until the space between each of said marks registers with a scale bearing a predetermined ratio to the spacing of the original marks and the punching of said different parts.

3. A method according to claim 1 for the recovery of the offall from the stamping of the larger parts of the gloves and too small to be used for stamping out the smaller parts of said gloves in the same direction as the main parts, said method comprising a thorough stretching of the offall in the same direction as the previous stretching, the impression of new equally spaced marks and a stretching in a direction perpendicular to the last mentioned until each of said new marks matches with a scale the marks of which are spaced in the same ratio as for the larger parts, the last stretching being followed immediately by the stamping of said smaller parts.

JULIEN FRANÇOIS MÉRIGUET.